United States Patent [19]

Cleaveland et al.

[11] 4,234,147
[45] Nov. 18, 1980

[54] SHAFT-CLAMPING DEVICE

[75] Inventors: Charles M. Cleaveland, North Huntingdon; Peter M. Kowalik, Trafford, both of Pa.

[73] Assignee: Cleaveland/Price Enterprises, Inc., Trafford, Pa.

[21] Appl. No.: 3,654

[22] Filed: Jan. 15, 1979

[51] Int. Cl.³ .............................................. F16L 3/08
[52] U.S. Cl. .................................................. 248/74 R
[58] Field of Search ................. 248/74 R, 74 A, 74 B

[56] References Cited
U.S. PATENT DOCUMENTS

| 1,279,297 | 9/1918 | Drohan | 248/74 R |
| 1,781,145 | 11/1930 | Williams | 248/74 B |
| 1,808,328 | 6/1931 | Thomson | 248/74 R |
| 2,162,340 | 6/1939 | Peterman | 248/74 R |
| 3,204,901 | 9/1965 | Dunn | 248/74 B |

Primary Examiner—James C. Mitchell
Attorney, Agent, or Firm—Willard R. Crout

[57] ABSTRACT

An improved shaft-clamping device is provided utilizing a loop-bolt which wraps spirally around the shaft, or pipe to be clamped to another member, and such member is provided with a pair of spaced mounting apertures, through which the legs of the loop-bolt project, and have fastening means secured thereto, such as nuts, for example.

Preferably, to increase the friction between the loop-bolt, or shaft-clamping device to the shaft, or pipe, the loop-bolt is threaded. This not only increases the frictional relationship between the shaft, or pipe and the other member, to which the shaft, or pipe is to be clamped, but, additionally, the threaded condition of the legs of the loop-bolt allow the clamping nuts to be threadedly secured thereto without further manufacturing operations. Heat treatment of the threaded loop-bolt brings the best result since the biting action is increased and the loop-bolt can be reused without flattening the threads.

11 Claims, 6 Drawing Figures

SHAFT-CLAMPING DEVICE

BACKGROUND OF THE INVENTION

The present invention particularly relates to a shaft-clamping device which spirally engages a pipe, or shaft in frictional relationship. This is a major improvement over the standard "U" bolt, as well known in the prior art, since there is approximately three times as much contacting surface to develop the friction that prevents rotation between the shaft and the other member, such as a supporting plate, for example. When a pipe is used as a shaft, a "U" bolt tends to flatten, or collapse the pipe, thereby limiting the tightness of the "U" bolt. In addition, a bearing cannot be located near the collapsed area since it is out-of-round. There is, of course, many situations where it is desirable to fixedly and rigidly clamp a shaft, or a pipe to another member, where the other member is utilized as an operating lever, for example, to effect concomitant rotation of the shaft, or pipe with rotational movement of the operating lever clamped to the shaft, or pipe. Any slippage therebetween wound, of course, be undesirable.

SUMMARY OF THE INVENTION

It is a general object of the present invention to provide an improved shaft-clamping device which will fixedly and firmly frictionally engage the shaft, or pipe to another member for non-rotational movement therebetween.

Another object of the present invention is to provide an improved shaft-clamping device which is inexpensive and may be manufactured in large numbers.

Still another object of the present invention is to provide an improved shaft-clamping device which may be adjusted by suitable means to either effect a frictional clamping arrangement between the shaft, or pipe and the secondary member, or, where desired, to effect a release of the frictional engagement without effecting a destruction of the clamping device or shaft and to also reestablish the engagement.

Still a further object of the present invention is to provide a "loop-bolt" having leg portions which project through mounting apertures provided in the secondary member.

An ancillary object of the present invention is to provide a loop-bolt which is entirely threaded, so that the threads not only effect a biting action between the loop-bolt and the encircled shaft, or pipe, but, additionally, the threads disposed at the end leg extremities, enable a ready attachment of mounting nuts, when this fastening means is utilized.

Further objects and advantages will readily become apparent upon reading the following specification taken in conjunction with the drawings attached to the instant patent application.

Briefly, the present invention contemplates a loop-bolt which comprises a clamping rod-member, preferably threaded in its entirety, which is wrapped around the pipe, or shaft in a spiral relationship. The leg extremities of the loop-bolt project through associated spaced mounting apertures provided in a secondary member, to which it is desired to fixedly, frictionally secure the shaft, or pipe. By an associated heat treatment of the threaded loop-bolt, there results hundreds of biting edges that key into the shaft and also eliminate secondary threading operations for the clamping nuts, since the loop-bolt is already threaded in its entirety. Moreover, the threaded loop-bolt may be reused without flattening the threads.

DESCRIPTION OF THE PREFERRED EMBODIMENT

Figure 1:
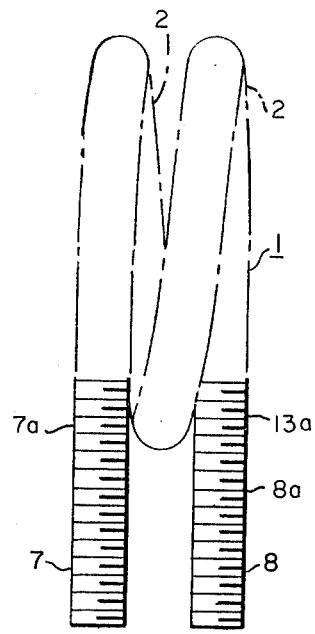
FIG. 1 illustrates, in detail, a side elevational view of the improved loop-bolt of the present invention.
Figure 2:
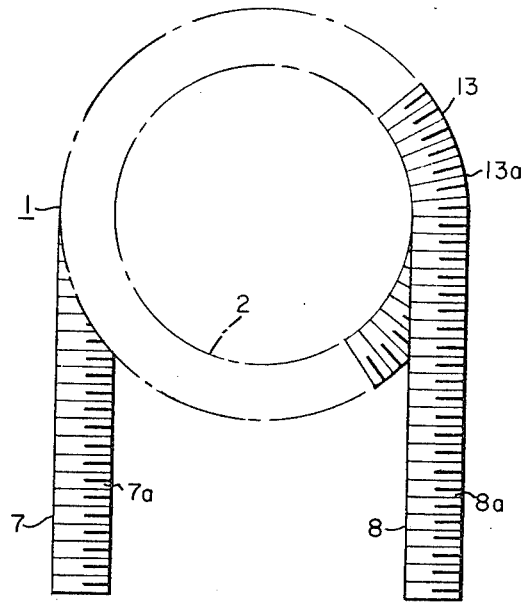
FIG. 2 is an end elevational view of the loop-bolt of FIG. 1.
Figure 3:
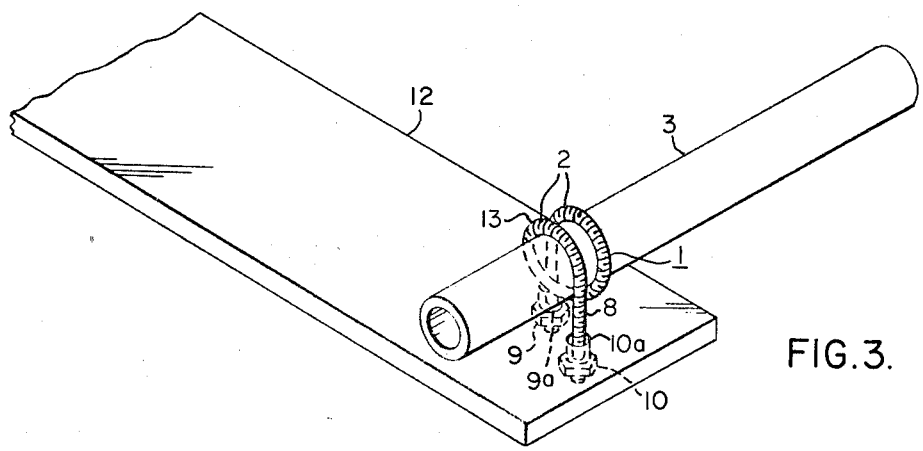
FIG. 3 illustrates, in perspective, the utilization of the loop-bolt of FIGS. 1 and 2 by frictionally clamping a shaft, or pipe to an associated secondary supporting member, and indicating the clamping nuts secured to the leg portions of the loop-bolt.

Referring to the drawings, and more particularly to FIGS. 1 and 2 thereof, the reference numeral 1 generally designates a loop-bolt which comprises two or more coil turns 2, which may be used to encircle a pipe, or shaft 3, as shown more clearly in FIG. 3 of the drawings. It will be observed that the loop-bolt 1 is provided with a pair of leg extremities 7 and 8, which are preferably threaded as at 7a, 8a so as to accommodate adjustably clamping nuts 9 and 10, illustrated again in FIG. 3.

The supporting member, to which the rod, or pipe 3 is to be fixedly attached, is designated by the reference numeral 12, and may be utilized in a variety of ways, as will be obvious to those skilled in the art. For example, the supporting plate 12 may be, if desired, disposed in a vertical relationship to tightly and frictionally engage the pipe 3 in a vertical disposition. Or, where desired for other applications, the secondary member 12 may be rotated to concomitantly rotate the pipe 3 therewith. Thus, not only may the improved shaft-clamping device 1 of the instant invention be used for supporting purposes, but also, where desired, it may be used where it is desired to effect rotation of the pipe 3 corresponding with rotational movement of the secondary member 12.

The present invention particularly relates to the loop-bolt 1 and is concerned with a means of rigidly fastening a secondary member to a round shaft to prevent relative rotation of the two. A unique feature of the novel loop-bolt 1 of the present invention is the double wrap 2 that surrounds the shaft 3, and applies a uniform radial load onto it. This is a major improvement over the standard "U" bolt, since there results approximately three times as much contacting surface to develop the friction that prevents rotation between the shaft 3 and the plate 12. When a pipe is used as a shaft, a "U" bolt tends to flatten, or to collapse the pipe, thereby limiting the tightness of the "U" bolt. In addition, a bearing cannot be located near the collapsed area since it is out-of-round. The loop-bolt 1, with its uniform radial load surrounding the pipe, cannot crush, or collapse the pipe 3. Therefore, the loop-bolt can be tightened to a much greater level than the "U" bolt and can have a bearing disposed very near it.

To provide an engagement between the loop-bolt and the shaft in addition to the friction, a further feature of the instant invention provides the loop-bolt with an "all-threaded" condition 13. This provides hundreds of biting edges that key into the shaft 3 and also eliminates secondary threading operations for the nuts 9, 10, since the loop-bolt 1 is already threaded in its entirety. It is, in effect, a self-splining device. Heat treating of the threaded loop-bolt 1 brings the best results since the biting action is increased, and the loop-bolt can be re-used without flattening the threads. This is desirable to get the proper utilization of the invention.

Figure 4:
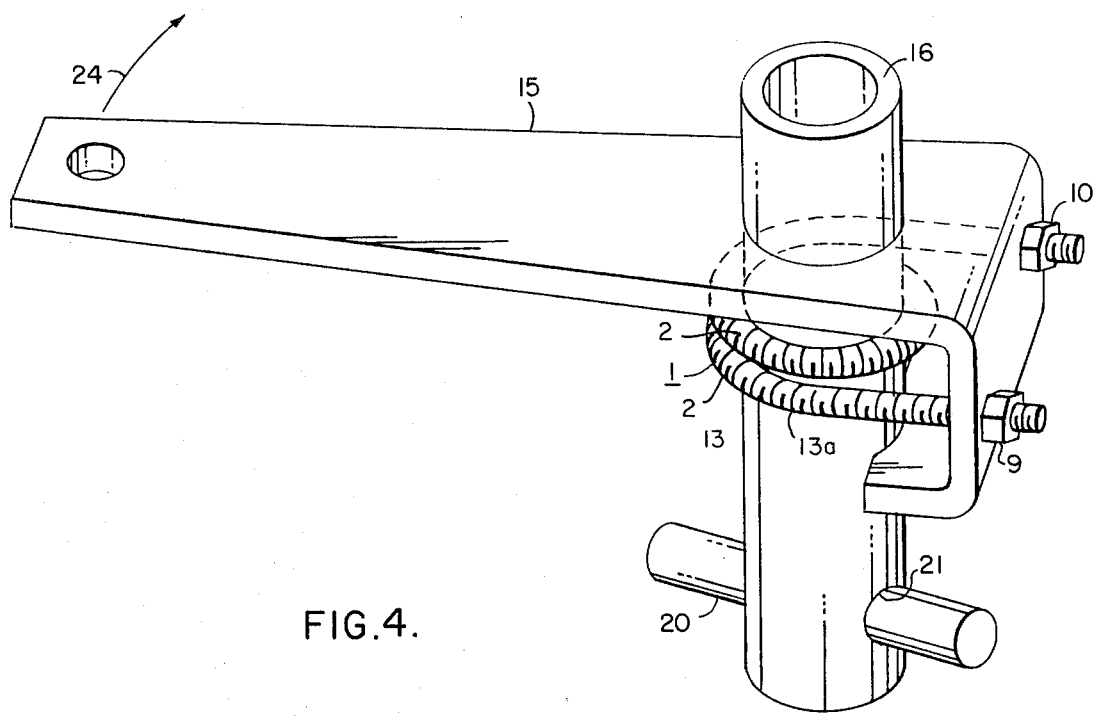
FIG. 4 illustrates the utilization of the loop-bolt to clamp a pipe or shaft to a lever and which was used to test the effectiveness of the loop-bolt in preventing slippage therebetween.

FIG. 4 illustrates another arrangement, wherein an operating lever 15 is fixedly secured by an application of the present invention to a pipe 16 by the encirclement of the improved loop-bolt 1 of the present invention.

A reaction pin 20 passes through a hole 21 provided in the pipe 16 to prevent rotation of the pipe 16. An applied test load is applied to the extremity of the operating lever 15, as indicated by the arrow 24.

The following table of test data on the lever 15 and the pipe 16, illustrated in FIG. 4, shows the holding capability of the invention over the "U" bolt of the prior art.

| Type of Connection | Torque to Turn Lever Relative to Pipe |
| --- | --- |
| ⅜" "U" Bolt - Conventional Type | 4,200 in-lbs. |
| ⅜" "U" Bolt - Made from "All-Thread" Rod | 6,160 in-lbs. |
| ⅜" Loop Bolt made from "All-Thread" Rod - no heat treatment | 8,775 in-lbs. |
| ⅜" Loop Bolt made from "All-Thread" Rod and heat treated | 11,800 in-lbs. |

The last torque value was great enough to cause the ⅝" pin 20 to deform the hole 21 drilled through the 1½" IPS steel pipe 16.

Figure 5:
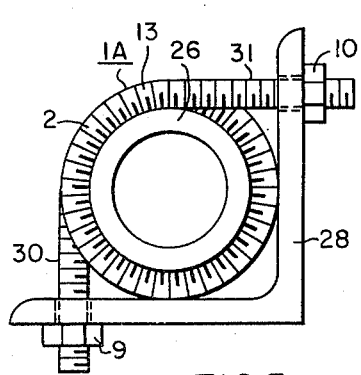
FIG. 5 illustrates another modification of the invention wherein the legs of the loop-bolt are not parallel and the secondary member comprises an angularly-shaped configuration; and, FIG. 6 illustrates fragmentarily another modification of the invention wherein the legs of the loop-bolt are not parallel, and the secondary member has a curved cross-section.

FIG. 5 shows an alternate construction wherein the shaft 26 is clamped by a modified loop-bolt 1A to an angularly-shaped secondary member 28. It will be noted here that the legs 30, 31 of the modified-type loop-bolt 1A are not parallel, but generally at right angles to each other.

Figure 6:
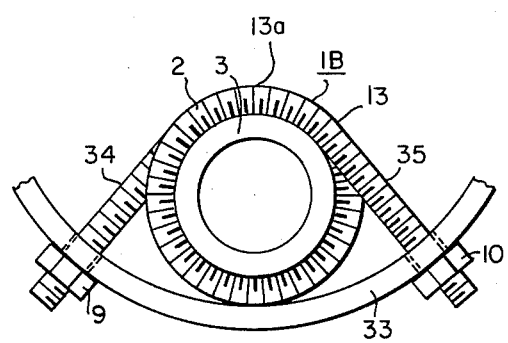

FIG. 6 illustrates a further construction in which the modified-type loop-bolt 1B secures the shaft 3 to a secondary member 33 of curved cross-section. Again, it will be noted that the legs 34, 35 of the modified loop-bolt 1B are not parallel to each other.

From the foregoing description of the invention, it will be apparent that there has been provided an improved shaft-clamping device comprising a loop-bolt 1 which spirally and frictionally engages a shaft, or pipe 3, 16 to be clamped to a secondary member, such as the members 12, 15 28, 33 in FIGS. 3, 4, 5 and 6, respectively.

The loop-bolt is preferably all-threaded, and is heat treated, and may, if desired, be finished by hot dip galvanizing action. The pitch of the loop coils 2 is not critical; however, the coils 2 should not touch each other. The threaded loop-bolt may be wrapped upon a soft-mandrel (not shown) during manufacture and this will prevent flattening of the threads 13 provided on the loop-bolt. The legs 7, 8 of the loop-bolt may be provided in a parallel relationship, as shown in FIG. 3, so as to facilitate their entrance into the spaced mounting apertures 9 and 10 of the associated supporting secondary plate 12, to which the shaft, or pipe 3 is to be fixedly secured.

However, the legs 30, 31 may be arranged in a non-parallel relationship as shown in the alternative embodiments of FIGS. 5 and 6.

Although there has been illustrated and described specific structures, it is to be clearly understood that the same were merely for the purposes of illustration, and that changes and modifications may readily be made therein, by those skilled in the art, without departing from the spirit and scope of the invention.

We claim:

1. A clamping device of the character described for tightly frictionally gripping and releasably clamping a rod-shaped member (3) firmly to a secondary member (12) comprising, in combination, means defining a loop-bolt (1) threaded in its entirety and having a pair of threaded end legs (7, 8) adapted for spirally frictionally encircling the rod-shaped member (3) for thereby exerting a substantially uniform radial inward clamping pressure-load thereon, means defining a secondary member (12) to be frictionally clamped to the rod-shaped member (3) and having a pair of spaced mounting apertures (9a, 10a) provided therein, the free ends of the two leg members (7, 8) of the entirely threaded loop-bolt (1) projecting through the two spaced mounting apertures (9a, 10a) of the secondary member (12), and adjustable fastening means provided on the extremities of the threaded legs (7, 8) of the loop-bolt (1) and located upon the opposite side of said secondary member (12), whereby the threads provided upon the surface of the loop-bolt (1) bite into the outer surface area of the rod-shaped member (3) and thereby prevent relative rotation between the rod-shaped member (3) and the secondary member (12).

2. The clamping device of claim 1, wherein the threads of the loop-bolt are heat treated to maintain their rigidity and thus to provide a firm biting keying action for engaging the rod-shaped member.

3. The combination according to claim 1, wherein the adjustable fastening means comprises a pair of adjustable clamping nuts which are threaded upon the threaded legs (7, 8) of the loop-bolt.

4. The combination according to claim 1, wherein the end legs (7, 8) of the loop-bolt (1) are disposed in a generally parallel relationship.

5. The combination according to claim 1 wherein the legs (30, 31) of the loop-bolt (1A) are disposed in a non-parallel relationship.

6. A clamping device of the character described for tightly frictionally gripping and releasably clamping a rod-shaped member (3) firmly to a secondary member (12) comprising, in combination, means defining a loop-bolt (1) threaded in its entirety and having a pair of threaded end legs (7, 8) adapted for at least making one complete turn about said rod-shaped member (3) for thereby exerting a substantially uniform radial inward clamping pressure-load thereon, means defining a secondary member (12) to be frictionally clamped to the rod-shaped member (3) and having a pair of spaced mounting apertures (9a, 10a) provided therein, the free ends of the two leg members (7, 8) of the entirely threaded loop-bolt (1) projecting through the two spaced mounting apertures (9a, 10a) of the secondary member (12), and adjustable fastening means provided on the extremities of the threaded legs (7, 8) of the loop-bolt (12), whereby the threads provided upon the surface of the complete turn of the loop-bolt (1) bite into the outer surface area of the rod-shaped member (3) and thereby prevent relative rotation between the rod-shaped member (3) and the secondary member (12).

7. The clamping device of claim 1, wherein the loop-bolt (1) makes more than one complete turn around the rod-shaped member (3) for additional frictional engaging contact with the said rod-shaped member (3).

8. The combination according to claim 7, wherein the loop-bolt (1) makes substantially two complete turns around the rod-shaped member (3) for additional biting action and also to substantially align the end legs (7, 8) of the loop-bolt (1).

9. The combination according to claim 7, wherein the ends of the entirely threaded loop-bolt (1) are at an angle with respect to each other.

10. A clamping device adaptable for releasable clamping a rod-shaped member to a separate secondary member (12) comprising an elongated entirely threaded metallic rod formed into a complete loop to encircle the rod-shaped member (3) and having the extremities of said entirely threaded metallic rod extended in straight lines to accommodate clamping nuts (9, 10).

11. A clamping device adaptable for releasably clamping a rod-shaped member (3) to a separate secondary member (12) comprising an elongated entirely threaded metallic rod formed into more than one turn or loop to encircle the rod-shaped member (3) and having the extremities of said entirely threaded metallic rod extended in straight paths to accommodate clamping nuts (9, 10).

* * * * *